US007949259B2

(12) United States Patent
Suzuki (10) Patent No.: US 7,949,259 B2
(45) Date of Patent: May 24, 2011

(54) VISIBLE LIGHT COMMUNICATION SYSTEM AND METHOD THEREFOR

(75) Inventor: Katsuyoshi Suzuki, Soka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1037 days.

(21) Appl. No.: 11/513,143

(22) Filed: Aug. 31, 2006

(65) Prior Publication Data

US 2007/0058987 A1 Mar. 15, 2007

(30) Foreign Application Priority Data

Sep. 13, 2005 (JP) ................................ 2005-265694

(51) Int. Cl.
*H04B 10/00* (2006.01)

(52) U.S. Cl. ........ 398/172; 398/182; 398/183; 398/189; 398/198

(58) Field of Classification Search .................. 398/172, 398/202, 198, 182, 183, 189, 192
See application file for complete search history.

(56) References Cited

U.S. PATENT DOCUMENTS

| | | | | | |
|---|---|---|---|---|---|
| 5,866,911 | A | * | 2/1999 | Baer | 250/458.1 |
| 6,914,637 | B1 | * | 7/2005 | Wolf et al. | 348/473 |
| 6,917,762 | B2 | * | 7/2005 | Kim | 398/155 |
| 7,309,965 | B2 | * | 12/2007 | Dowling et al. | 315/318 |
| RE40,864 | E | * | 7/2009 | Hong et al. | 345/98 |
| 7,583,901 | B2 | * | 9/2009 | Nakagawa et al. | 398/183 |
| 7,689,130 | B2 | * | 3/2010 | Ashdown | 398/172 |
| 2002/0167701 | A1 | * | 11/2002 | Hirata | 359/172 |
| 2003/0118183 | A1 | * | 6/2003 | Struyk | 380/213 |
| 2006/0083518 | A1 | * | 4/2006 | Lee et al. | 398/155 |
| 2006/0239689 | A1 | * | 10/2006 | Ashdown | 398/130 |
| 2007/0115238 | A1 | * | 5/2007 | Eom et al. | 345/98 |
| 2008/0063410 | A1 | * | 3/2008 | Irie | 398/182 |

FOREIGN PATENT DOCUMENTS

| | | |
|---|---|---|
| CN | 1185617 A | 6/1998 |
| CN | 1209618 A | 3/1999 |
| JP | 1-122220 | 5/1989 |
| JP | 9-233025 | 9/1997 |
| JP | 2002 202741 | 7/2002 |
| JP | 2002-202741 | 7/2002 |

(Continued)

OTHER PUBLICATIONS

First Office Action, dated Nov. 6, 2009, issued in counterpart Chinese Patent application No. 2006101515725, with English translation (32 pages).
Background Art Information and concise explanation for JP 2004 221747, JP 2002 202741, and JP 2004 147063. (2 pages).

(Continued)

*Primary Examiner* — Ken N Vanderpuye
*Assistant Examiner* — Hibret A Woldekidan
(74) *Attorney, Agent, or Firm* — Finnegan, Henderson, Farabow, Garrett & Dunner, L.L.P.

(57) ABSTRACT

In a visible light communication system, a transmission device includes a data modulation section which assigns 1-bit information to each of visible lights of RGB, and modulates transmission data into 3-bit modulation data. An LED light emission section transmits a multiplexed visible light signal, in which the RGB visible lights are multiplexed in accordance with the modulation data.

4 Claims, 5 Drawing Sheets

FOREIGN PATENT DOCUMENTS

| | | |
|---|---|---|
| JP | 2002-527917 | 8/2002 |
| JP | 2002-290335 | 10/2002 |
| JP | 2003-318836 | 11/2003 |
| JP | 2004-147063 | 5/2004 |
| JP | 2004 147063 | 5/2004 |
| JP | 2004 221747 | 8/2004 |
| JP | 2004-221747 | 8/2004 |
| JP | 2005-142773 | 6/2005 |
| JP | 2007-19935 | 1/2007 |

OTHER PUBLICATIONS

Notice of Reasons for Rejection from the Japanese Patent Office mailed May 25, 2010, in Japanese Patent Application No. 2005-265694 (7 pages).

* cited by examiner

FIG. 1

| | R | G | B |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

VISIBLE LIGHT COMMUNICATION SYSTEM AND METHOD THEREFOR

CROSS-REFERENCE TO RELATED APPLICATIONS

This application is based upon and claims the benefit of priority from prior Japanese Patent Application No. 2005-265694, filed Sep. 13, 2005, the entire contents of which are incorporated herein by reference.

BACKGROUND OF THE INVENTION

1. Field of the Invention

The present invention relates generally to a visible light communication system which makes use of visible light, and more particularly to a visible light communication system which makes use of a multiplexed visible light signal in which RGB visible lights are multiplexed.

2. Description of the Related Art

In recent years, a visible light communication system which makes use of visible light has steadily been developed. There have been proposed visible light communication systems which use, as light sources, light-emitting diodes (LEDs) or light sources for illumination (see, e.g. Patent Document 1).

Also proposed is a visible light communication technique wherein information is transmitted by light communication by flickering LEDs at such a high speed that visual recognition is impossible (see, e.g. Patent Document 2).

Visible light communication systems adopt, as communication methods, such modulation methods as AM (amplitude modulation), FM (frequency modulation) and PM (pulse modulation), which are based on variations in luminance of visible light. Specifically, visible light, which is emitted from a light source, is modulated in accordance with transmission data (digital signal string), and the modulated light is transmitted as a visible light signal.

In the meantime, in the communication method using an LED as a light source, white light is, in general, emitted by combining lights of the three primary colors (also expressed as RGB) of red (R), green (G) and blue (B), and the white light is modulated. In addition, there is known a communication method in which the emission amount of light of an LED is varied in accordance with a signal waveform of information to be transmitted, and the light with the varied emission amount is transmitted (see, e.g. Patent Document 3).

Patent Document 1: Jpn. Pat. Appln. KOKAI Publication No. 2004-221747,

Patent Document 2: Jpn. Pat. Appln. KOKAI Publication No. 2002-202741, and

Patent Document 3: Jpn. Pat. Appln. KOKAI Publication No. 2004-147063.

In a visible light communication system using the LED as a light source, the sizes of a transmission device and a reception device can be reduced and the power consumption can be decreased. Thus, this communication system is useful as a communication system which employs a mobile phone, for instance. However, in a case where high-speed communication is to be realized by increasing the modulation speed, it is difficult to realize such high-speed communication because of, e.g. responsivity characteristics of the LED.

The object of the present invention is to provide a visible light communication system wherein high-speed communication is enabled, in particular, without increasing a modulation speed, by realizing multiplex visible light communication in which visible lights of RGB are multiplexed.

BRIEF SUMMARY OF THE INVENTION

According to an aspect of the present invention, there is provided a visible light communication system including a transmission device which transmits a visible light signal and a reception device which receives the visible light signal, the transmission device comprising: light emission means for emitting visible lights of red, green and blue; data modulation means for assigning 1-bit information to each of the visible lights and modulating transmission data into 3-bit modulation data; and transmission control means for driving and controlling the light emission means in accordance with the modulation data which is output from the data modulation means, and transmitting a multiplexed visible light signal, in which the visible lights are multiplexed, from the light emission means.

DETAILED DESCRIPTION OF THE INVENTION

Embodiments of the present invention will now be described with reference to the accompanying drawings.

First Embodiment

Figure 1:
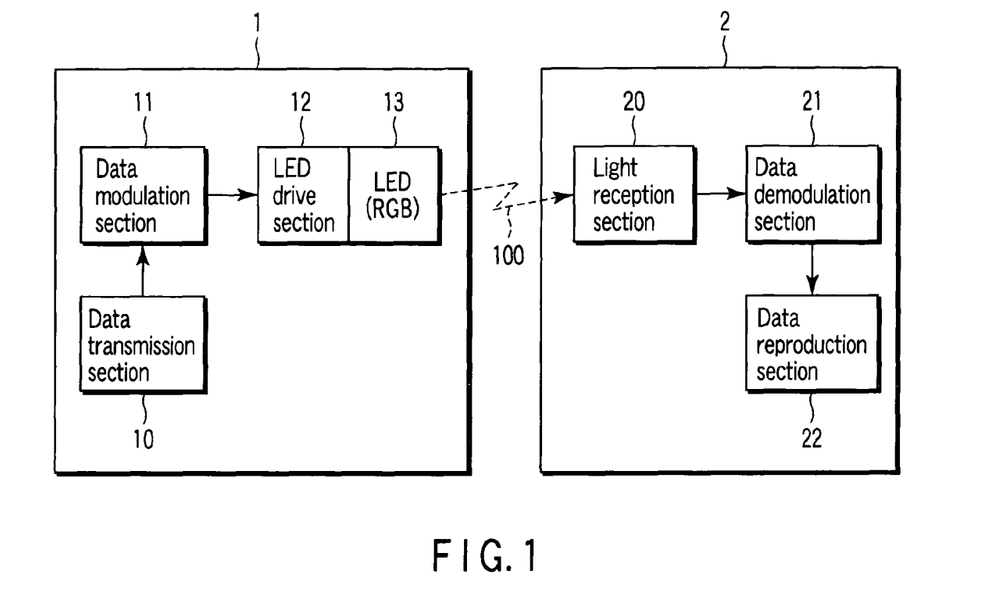
FIG. 1 is a block diagram showing the structure of a visible light communication system according to a first embodiment of the present invention.

FIG. 1 is a block diagram showing the structure of a visible light communication system according to a first embodiment of the present invention.

The system of this embodiment includes a transmission device 1, which is built, for example, in a personal computer, and a reception device 2 which is built, for example, in an AV apparatus. This system executes data communication by a multiplexed visible light signal 100. Needless to say, the transmission device 1 and reception device 2 are not limited to the built-in type devices, and may be external-attachment type devices.

The transmission device 1 includes a data transmission section 10, a data modulation section 11, and an LED light emission section 13 having LED elements of RGB. The data transmission section 10 outputs, for example, digital audio data as transmission data. As will be described later, the data modulation section 11 assigns 1 bit to each of visible lights of RGB, modulates the transmission data and outputs 3-bit modulation data.

The LED light emission section 13 causes the LED elements of RGB to emit light in accordance with power that is supplied from an LED drive section (driver) 12, and transmits the multiplexed visible light signal 100. The LED drive section 12 controls power, which is supplied to the LED light emission section 13, so as to turn on/off the LED elements of RGB in accordance with the modulation data from the data modulation section 11.

On the other hand, the reception device 2 includes a light reception section 20 which receives the multiplexed visible light signal 100, a data demodulation section 21 and a data reproduction section 22. The light reception section 20 separates the multiplexed visible light signal 100 into RGB visible lights, and outputs a reception data signal, which corresponds to the on/off state of each of RGB visible lights, to the data demodulation section 21. The data demodulation section 21 demodulates the reception data signal to the transmission data of the transmission side. Further, the data reproduction section 22 reproduces the transmission data, which is demodulated by the data demodulation section 21, for example, as audio data.

Next, referring to FIG. 2, FIG. 3, FIG. 5 and FIG. 6, the data communication operation of this embodiment is described. To begin with, the procedure of the transmission device 1 is described with reference to a flow chart of FIG. 5.

Figure 2:
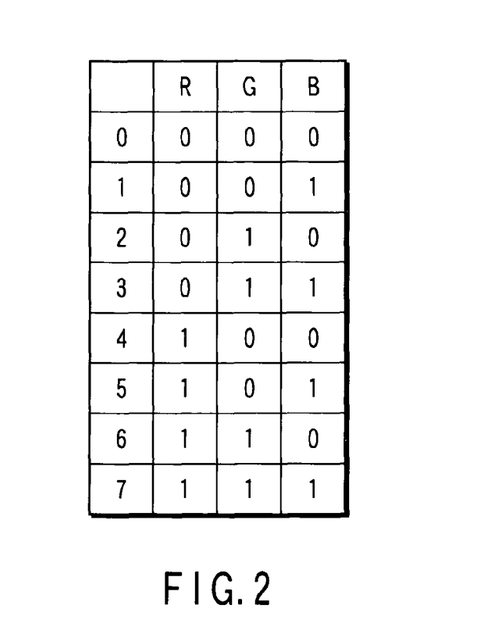
FIG. 2 is a view for explaining a data expression of a transmission device according to the first embodiment.
Figure 5:
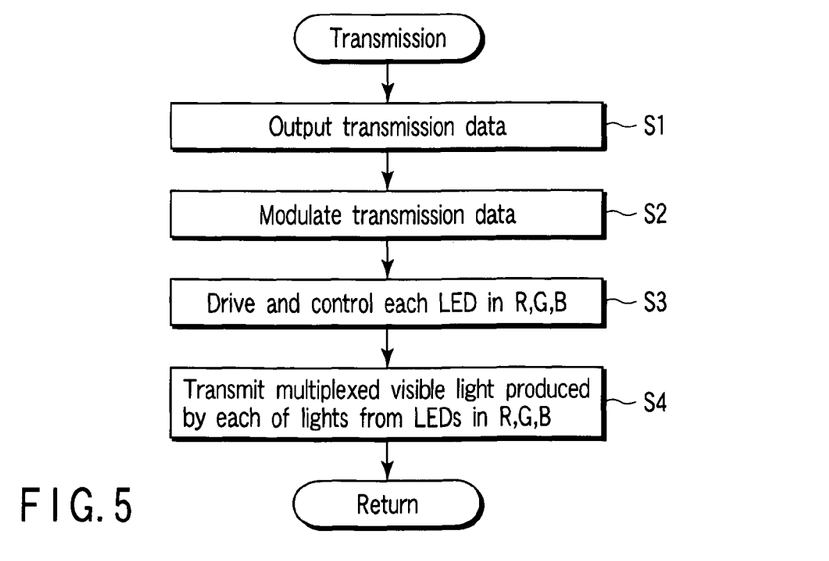
FIG. 5 is a flow chart illustrating a procedure of a transmission device according to the first embodiment.

To start with, the data transmission section 10 outputs, for example, audio data (digital data) that is the object of transmission, as transmission data (normally, encoded in a predetermined format) (step S1). The data modulation section 11 assigns 1 bit to each of RGB visible lights, and modulates the transmission data into 3-bit modulation data (step S2). Specifically, the 3-bit modulation data can be expressed as 8 data patterns, as shown in FIG. 2.

Figure 3:
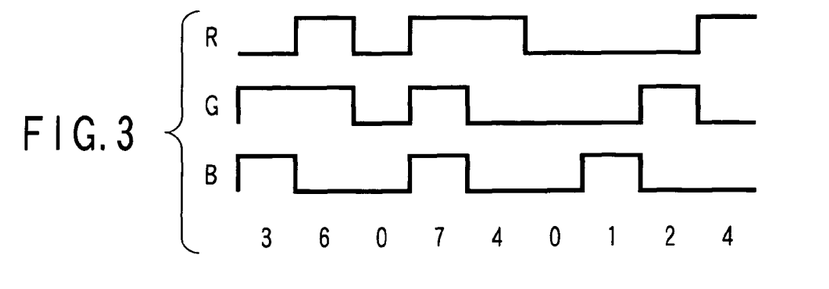
FIG. 3 is a timing chart showing the state of a multiplexed RGB visible light signal according to the first embodiment.

Subsequently, according to the 3-bit modulation data, the LED drive section 12 drives and on/off controls the LED elements of RGB of the LED light emission section 13 (step S3). Thereby, the LED light emission section 13 multiplexes the RGB visible lights, which are modulated according to the 3-bit modulation data, and transmits a multiplexed visible light signal (step S4). Specifically, a multiplexed visible light signal, which is composed of the RGB visible lights that are modulated according to the 3-bit modulation data, as shown in FIG. 3, is transmitted.

Figure 6:
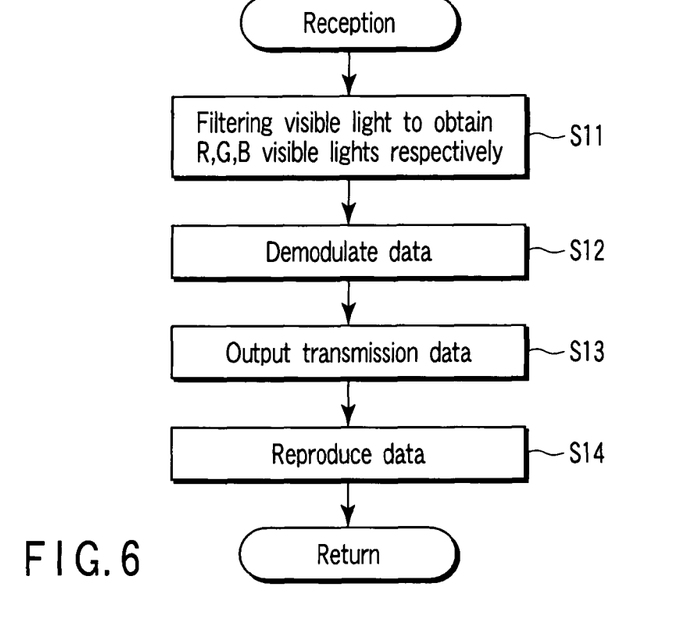
FIG. 6 is a flow chart illustrating a procedure of a reception device according to the first embodiment.

Next, the procedure of the reception device 2 is described with reference to a flow chart of FIG. 6.

Upon receiving the multiplexed visible light signal from the transmission device 1, the light reception section 20 separates the multiplexed visible light signal into RGB visible lights by filtering, and outputs a reception data signal corresponding to the on/off state of each of the RGB visible lights (step S11). The data demodulation section 21 demodulates the reception data signal, which is output from the light reception section 20, into the transmission data that is the object of transmission (step S12, S13). Further, the data reproduction section 22 reproduces the transmission data, which is demodulated by the data demodulation section 21, for example, as audio data (step S14).

As has been described above, according to the visible light communication system of this embodiment, the transmission device 1 can transmit the transmission data as the multiplexed visible light signal which is modulated as the 3-bit RGB visible light signal. Thus, compared to the case where white visible light, which is composed of RGB visible lights, is directly modulated and transmitted, 3-bit RGB visible light signals can be transmitted at the same time. Therefore, without the need to increase the modulation speed, high-speed visible light communication can be realized.

To be more specific, audio data, for instance, is transmitted at high speed as a multiplexed visible light signal from, e.g. a personal computer via the transmission device 1. The AV apparatus receives the multiplexed visible light signal by the reception device 2, thus being able to reproduce the audio data. Thereby, in the case where the audio data is music data, such a system is realized that the music data that is stored in the personal computer is wirelessly transmitted to the AV apparatus and music is reproduced by the AV apparatus.

Second Embodiment

Figure 4:
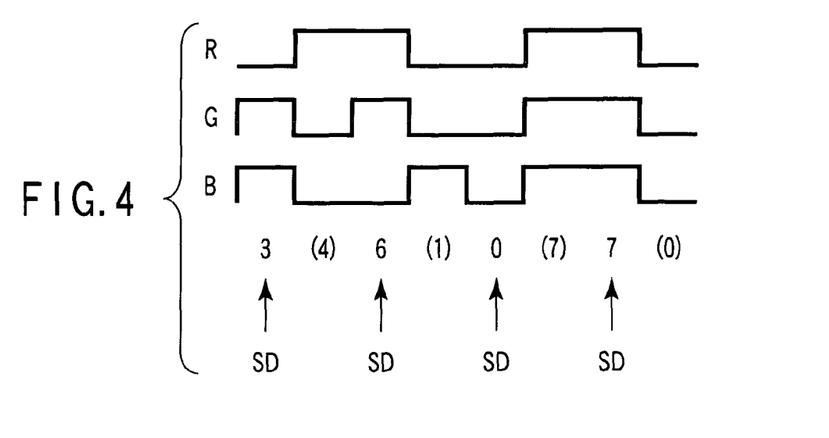
FIG. 4 is a timing chart showing the state of a multiplexed RGB visible light signal according to a second embodiment.
Figure 7:
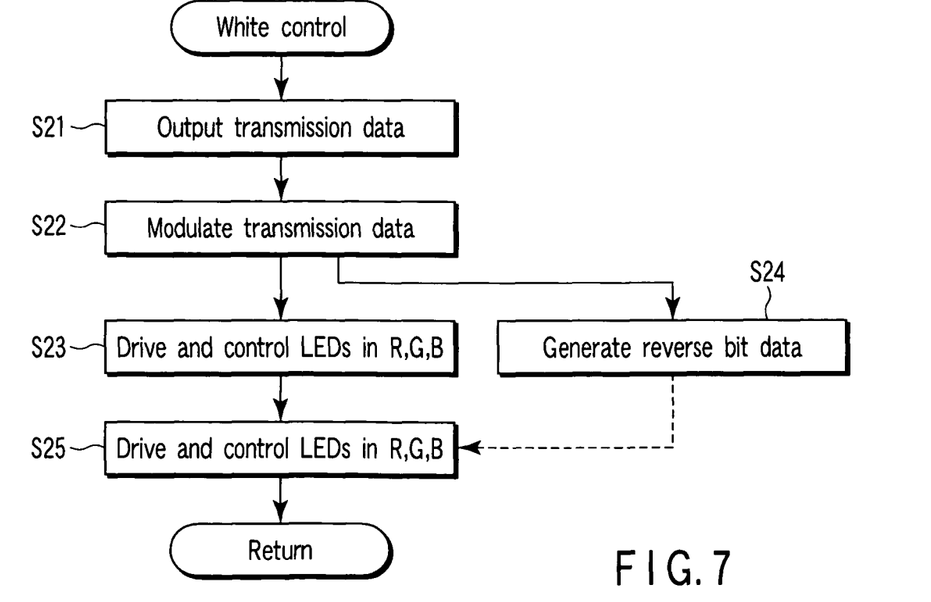
FIG. 7 is a flow chart illustrating a procedure of a transmission device according to the second embodiment.

FIG. 4 and FIG. 7 relate to a second embodiment of the invention. The structure of the visible light communication system is the same as shown in FIG. 1. An overlapping description with the first embodiment is omitted.

As described in connection with the first embodiment, the transmission device 1 transmits data as a multiplexed visible light signal in which RGB visible lights are modulated. In this case, in normal cases, the multiplexed visible light of RGB is emitted as white light. However, in actual data transmission, the frequency of occurrence of RGB is non-uniform, and the RGB multiplexed visible light is possibly emitted not as white visible light but as visible light that varies in seven colors.

The present embodiment relates to a transmission device 1 wherein a white variation of the RGB multiplexed visible light is suppressed, and the RGB multiplexed visible light, which is transmitted, is always maintained as white visible light. The embodiment is described below in detail with reference to FIG. 4 and a flow chart of FIG. 7.

To start with, in the transmission device 1, the data transmission section 10 outputs, for example, audio data, which is the object of transmission, as transmission data (step S21). The data modulation section 11 assigns 1 bit to each of RGB visible lights, and modulates the transmission data into 3-bit modulation data (step S22) (see FIG. 2). In this case, the data modulation section 11 generates inverted bit data (white control data) of each of the RGB visible lights of the modulation data (step S24).

Subsequently, in a first transmission cycle, according to the 3-bit modulation data, the LED drive section 12 drives and on/off controls the LED elements of RGB of the LED light emission section 13 (step S23). Thereby, the LED light emission section 13 multiplexes the RGB visible lights, which are modulated according to the 3-bit modulation data, and transmits a multiplexed visible light signal. In the next cycle, according to the inverted bit data, the LED drive section 12 drives and on/off controls the LED elements of RGB of the LED light emission section 13 (step S25). Thereby, the LED light emission section 13 multiplexes the RGB visible lights, which are modulated according to the inverted bit data, and transmits a multiplexed visible light signal.

Specifically, as shown in FIG. 4, the transmission device 1 transmits an RGB multiplexed visible light signal according to the modulation data, which is composed of a 3-bit significant bit string SD. In the next cycle, the transmission device 1 transmits an RGB multiplexed visible light signal according to the inverted bit data of this 3-bit significant bit string SD. Accordingly, compared to the above-described first embodiment, the data transmission rate for data transmission is reduced to ½. However, by adding the inverted bit string to the modulation data, the non-uniformity in the frequency of occurrence of RGB is eliminated and the frequency of occurrence of RGB is made uniform. Therefore, the RGB multiplexed visible light, which is transmitted from the transmission device 1, can always be maintained as white visible light.

The reception device 2, as a matter of course, samples the RGB multiplexed visible light, which is modulated according to the modulation data of the significant bit string SD, from the RGB multiplexed visible light that is sent from the transmission device 1, and demodulates the transmission data of the transmission side. In other words, the reception device 2 removes the RGB multiplexed visible light signal, which is modulated according to the inverted bit data, from the demodulation process.

The second embodiment is directed to the case in which the inverted bit data of the modulation data is inserted in the cycle subsequent to the cycle of the modulation data. Alternatively, the inverted bit data may be inserted in other cycles. For example, inverted bit data may be inserted after every two cycles, or after every four cycles. The method of the insertion is not limited.

In short, the cycle of the insertion of the inverted bit data is determined in accordance with the required white level of white visible light.

Third Embodiment

Figure 8:
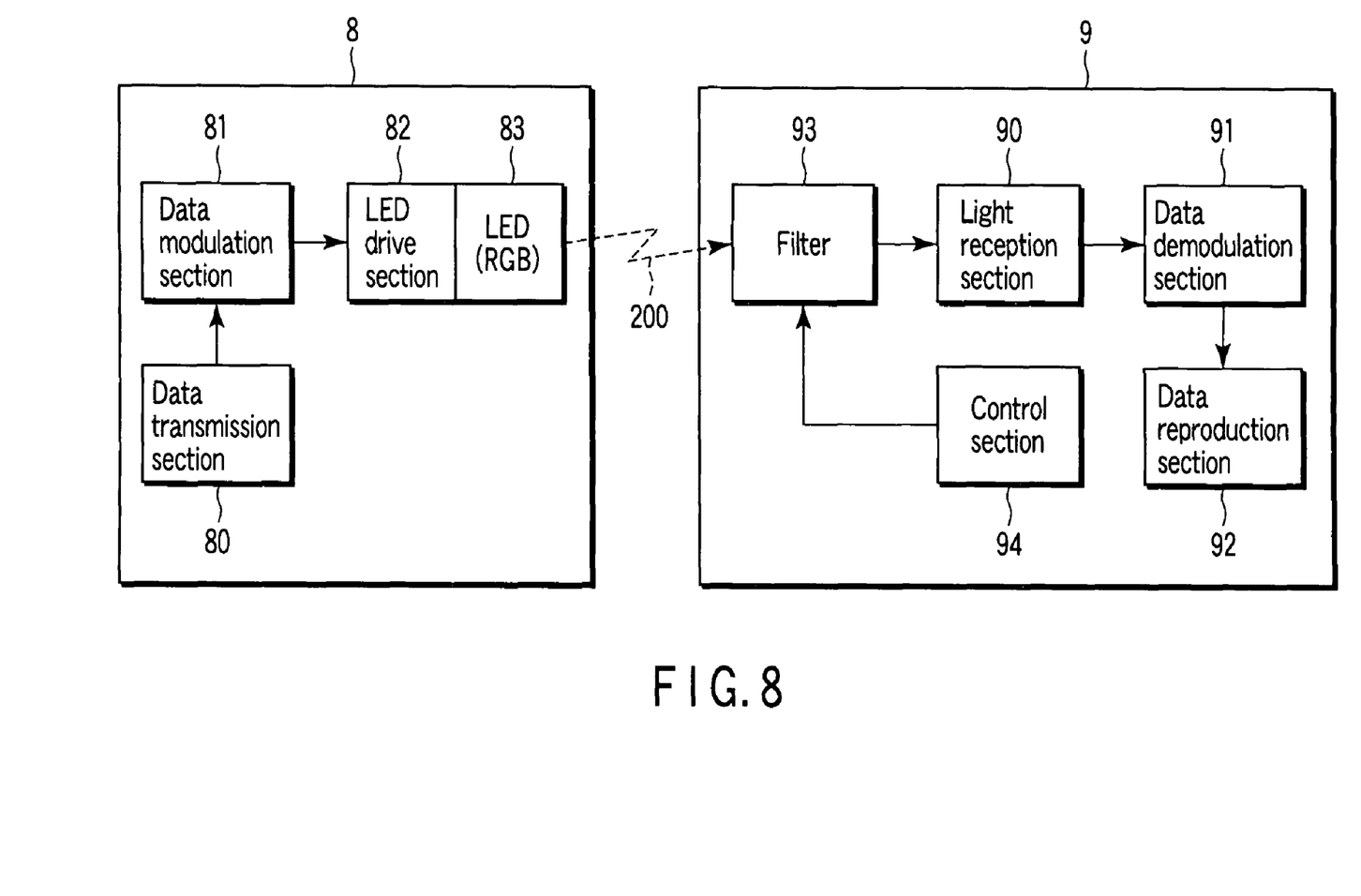
FIG. 8 is a block diagram showing the structure of a visible light communication system according to a third embodiment of the present invention.
Figure 9:
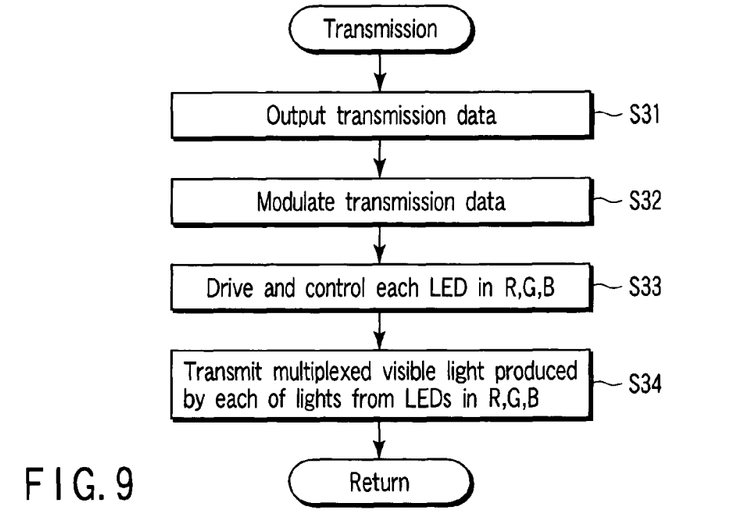
FIG. 9 is a flow chart illustrating a procedure of a transmission device according to the third embodiment.
Figure 10:
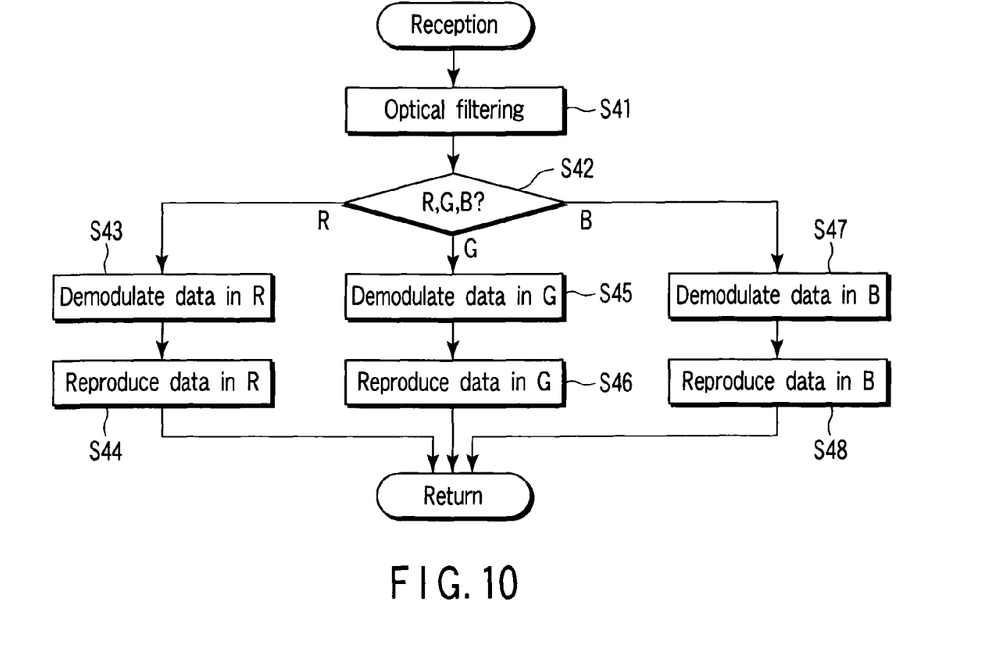
FIG. 10 is a flow chart illustrating a procedure of a reception device according to the third embodiment.

FIG. 8 to FIG. 10 relate to a third embodiment of the invention.

As is shown in FIG. 8, the system of this embodiment includes a transmission device 8, which is built, for example, in a personal computer, and a reception device 9 which is built, for example, in an AV apparatus. This system executes data communication by a multiplexed visible light signal 200. Needless to say, the transmission device 8 and reception device 9 are not limited to the built-in type devices, and may be external-attachment type devices.

The transmission device 8 includes a data transmission section 80, a data modulation section 81, and an LED light emission section 83 having LED elements of RGB. The data transmission section 80 outputs, for example, three kinds of audio data of different contents as transmission data. For example, the data transmission section 80 outputs audio data of three languages (Japanese, English and Spanish) as transmission data. The data modulation section 81 modulates the transmission data such that the audio data are assigned to visible lights of RGB, respectively.

The LED light emission section 83 causes the LED elements of RGB to emit light in accordance with power that is supplied from an LED drive section (driver) 82, and transmits the multiplexed visible light signal 200. The LED drive section 82 controls power, which is supplied to the LED light emission section 83, so as to turn on/off the LED elements of RGB in accordance with the modulation data from the data modulation section 81.

On the other hand, the reception device 9 includes an optical filter 93, a light reception section 90, a data demodulation section 91, a data reproduction section 92, and a control section 94. The optical filter 93 is an optical band-pass filter member for extracting a given color signal in the RGB visible lights from the multiplexed visible light signal 200.

The light reception section 90 outputs a reception data signal, which corresponds to the on/off state of the RGB visible light that is separated and extracted by the optical filter 93, to the data demodulation section 91. The data demodulation section 91 demodulates the reception data signal into the audio data that is the transmission data of the transmission side. Further, the data reproduction section 92 reproduces the audio data from the transmission data, which is demodulated by the data demodulation section 91.

In the case where the optical filter 93 is an electronically filtering-controllable member, the control section 94 controls the optical filter 93 so as to extract a color signal which is preselected from the RGB visible lights. In this embodiment, the optical filter 93 is a replaceable member. The optical filter 93 is selected from three kinds of optical filter members which pass RGB visible lights, respectively. The optical filter 93 is configured to be disposed at a predetermined position of the reception device 9. In an example of the method of attaching the optical filter 93, three kinds of optical filters, that is, an optical filter which passes only an R component, an optical filter which passes only a G component and an optical filter which passes only a B component, are arranged on associated attachment members and rotatably attached to the light reception section 90. One of the optical filters is selectively positioned in front of the light reception section 90.

Next, the procedure of the transmission device 8 of the present system is described with reference to a flow chart of FIG. 9.

To start with, the data transmission section 80 outputs audio data of three languages (Japanese, English and Spanish) as transmission data, respectively (step S31). The data modulation section 81 generates modulation data in which Japanese audio data is assigned, for example, to an R visible light signal, English audio data to a G visible light signal, and Spanish audio data to a B visible light signal (step S32).

Subsequently, according to the modulation data, the LED drive section 82 drives and on/off controls the LED elements of RGB of the LED light emission section 83 (step S33). Thereby, the LED light emission section 83 multiplexes the RGB visible lights, which are modulated according to the modulation data, and transmits a multiplexed visible light signal (step S34). Specifically, audio data of three languages (Japanese, English and Spanish) are modulated as a multiplexed visible light signal, and the multiplexed visible light signal is transmitted.

Next, the procedure of the reception device 9 is described with reference to a flow chart of FIG. 10.

In the reception device 9, the optical filter 93 selectively extracts one of the R visible light signal, G visible light signal and B visible light signal from the multiplexed visible light signal 200, which is sent from the transmission device 8, in accordance with preset band-pass characteristics (step S41).

The light reception section 90 outputs a reception data signal corresponding to the on/off state of the visible light that is extracted by the optical filter 93 (step S42). The data demodulation section 91 demodulates the audio data, which is the object of transmission, from the reception data signal that is output from the light reception section 90, and outputs the demodulated audio data (steps S43, S45 and S47).

The data reproduction section 92 reproduces the audio data that is demodulated by the data demodulation section 91. For example, if the audio data corresponding to the R visible light signal is demodulated, the data reproduction section 92 reproduces Japanese audio (steps S43 and S44). Similarly, if the audio data corresponding to the G visible light signal is demodulated, the data reproduction section 92 reproduces English audio (steps S45 and S46). If the audio data corresponding to the B visible light signal is demodulated, the data reproduction section 92 reproduces Spanish audio (steps S47 and S48).

As has been described above, according to the visible light communication system of this embodiment, in the reception device 9, the user controls the band-pass characteristics of the optical filter 93, for example, by setting the optical filter 93 corresponding to one of the RGB visible lights, or via the control section 94 from an input device that is provided on the reception device 9. Thereby, when the audio data of, e.g. three languages (Japanese, English and Spanish) are modulated and transmitted as a multiplexed visible light signal, the reception device 9 can selectively reproduce arbitrary audio data.

In other words, in the reception device 9, the optical filter 93 is simply set, and a special signal separating circuit for multiplex communication is not provided. Thereby, transmission data, such as arbitrary audio data, can be selected from the multiplexed visible light signal and reproduced.

Fourth Embodiment

Next, a fourth embodiment of the invention is described.

The system configuration of this fourth embodiment is similar to that of the third embodiment, but the light emission method of the LED light emission section 83 of the transmission device 8 is different. A detailed description is given below.

In the third embodiment, different audio data corresponding to RGB are multiplexed at a fixed level, and white light is emitted. In the fourth embodiment, visible light of an arbitrary color is emitted by varying the level of data.

For example, if audio data, for which R (red) is used, is attenuated (i.e. the level is lowered) and an audio signal for which G (green) is used and an audio signal for which B (blue) is used are set at normal levels, light of a complementary color of R (red) is emitted. Similarly, if audio data, for which G (green) is used, is attenuated, output light has a complementary color of green. If audio data, for which B (blue) is used, is attenuated, output light has a complementary color of blue. Further, output light of an arbitrary color, other than red, green and blue, can be obtained by combining color components to be attenuated.

If the level of an arbitrary audio signal is merely varied, the reception sensitivity may possibly deteriorate. Thus, by cyclically varying the level or by varying the level so that display parts have different colors, a variation in reception signal can be suppressed.

For example, the LEDs of the transmission device 8 may be formed in a shape of an arbitrary character (e.g. the name of a commercial product, the name of a company, etc.; the number of characters may be plural), and the character may be illuminated in a specific image color (e.g. the image color of a commercial product, the image color of a company, etc.). Therefore, the commercial image and the appearance of a commercial product can be enhanced.

In a possible modification of the invention, the light emission section 83 of the transmission device 8 may be caused to emit light corresponding to an arbitrary image. For example, the LEDs may be caused to emit light so as to display a TV broadcast image, and audio information of the corresponding broadcast image may be transmitted by visible light communication. Thereby, TV broadcast may be enjoyed.

The present invention is not limited directly to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

What is claimed is:

1. A visible light communication system including a transmission device, which transmits a visible light signal to a reception device, the transmission device comprising:
    a light emission section emitting visible lights of red, green and blue;
    a data modulation section:
        assigning 1-bit information to each of the visible lights
        modulating transmission data into 3-bit modulation data, and
        generating inverted bit data by flipping each bit associated with the 3-bit modulation data; and
    a transmission section driving and controlling the light emission section in accordance with the modulation data and the inverted bit data,
    wherein the light emission section further transmits a multiplexed visible light signal corresponding to the modulation data before transmitting a multiplexed visible light signal corresponding to the inverted bit data.

2. The visible light communication system according to claim 1 further comprising a reception device, the reception device including:
    a section receiving the multiplexed visible light signal which is transmitted from the light emission section; and
    a section extracting and demodulating the multiplexed visible light signal which corresponds to the modulation data.

3. The visible light communication system according to claim 1, wherein the light emission section includes:
    light-emitting diode elements which emit visible lights of red, green and blue; and
    a driving section driving the light-emitting diode elements, and emitting the visible lights at the same time or selectively.

4. A transmission method, which is applied to a visible light communication system including a transmission device, which transmits visible light signals of red, green and blue to a reception device, the method comprising the steps of:
    assigning 1-bit information to each of the visible light signals and modulating transmission data of a 3-bit string;
    generating inverted bit data by flipping each bit associated with the 3-bit string; and
    transmitting a multiplexed visible light signal corresponding to the modulation data before transmitting a multiplexed visible light signal corresponding to the inverted bit data.

* * * * *